United States Patent
Bossert

[11] 3,883,543
[45] May 13, 1975

[54] N-ALKYL-1,4-DIHYDROPYRIDINES
[75] Inventor: Friedrich Bossert, Wuppertal-Elberfeld, Germany
[73] Assignee: Bayer Aktiengesellschaft, Germany
[22] Filed: Nov. 2, 1973
[21] Appl. No.: 412,477

Related U.S. Application Data
[60] Division of Ser. No. 201,152, Nov. 22, 1971, Pat. No. 3,773,773, which is a continuation of Ser. No. 35,574, May 7, 1970, abandoned.

[30] Foreign Application Priority Data
May 10, 1969 Germany.............................. 1923990

[52] U.S. Cl. 260/295.5 B; 260/294.8 G; 260/294.9; 424/266
[51] Int. Cl.............................................. C07d 31/36
[58] Field of Search ............................. 260/295.5 R

[56] References Cited
UNITED STATES PATENTS
3,485,847  12/1969  Bossert et al. ............... 260/295.5 R Primary Examiner—Alan L. Rotman

[57] ABSTRACT

N-alkyl-1,4-dihydropyridines of the formula:

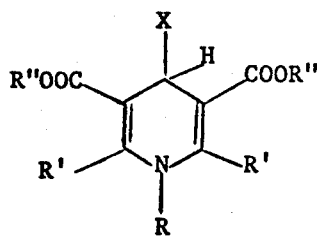

wherein
R is a saturated or unsaturated straight or branched chain aliphatic moiety, a saturated or unsaturated cycloaliphatic moiety, said cycloaliphatic moiety having an N, S or O heteroatom, said cycloaliphatic moiety or said cycloaliphatic moiety having an N, S, or O heteroatom substituted by carboxy, carbalkoxy, alkoxy, especially lower alkoxy, alkylmercapto, especially lower alkylmercapto, alkylamino, especially lower alkylamino, or dialkylamino, especially di-lower alkylamino, an araliphatic moiety or an araliphatic moiety substituted by alkyl, especially lower alkyl, alkoxy, especially lower alkoxy, nitro or halogen, R' is hydrogen or straight or branched chain alkyl of 1 to 4 carbon atoms, aryl, aryl substituted by alkyl, especially lower alkyl, nitro or halogen, or a heterocycle, R'' is a saturated or unsaturated, straight or branched chain aliphatic moiety of 1 to 6 carbon atoms, a saturated or unsaturated cycloaliphatic moiety or said cycloaliphatic moiety having an N, S or O heteroatom, and X is a saturated or unsaturated, straight or branched chain aliphatic or isocyclic moiety, a heterocycle, aryl, aryl substituted by alkyl, especially lower alkyl, alkoxy, especially lower alkoxy, carbalkoxy, especially carb-lower alkoxy, alkylmercapto, especially lower alkylmercapto, trifluoromethyl, nitrile, nitro or halogen, aralkyl, aralkylene or aralkyl or aralkylene substituted by alkyl, especially lower alkyl, alkoxy, especially lower alkoxy, carbalkoxy, especially carb-lower alkoxy, alkylmercapto, especially lower alkylmercapto, trifluoromethyl, nitrile, nitro or halogen are produced by reacting an aldehyde of the formula:

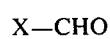

wherein
X is as shown defined with a β-ketocarboxylic acid ester of the formula:

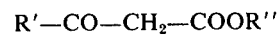

wherein
R' and R'' are as above defined with a salt of an alkylamine of the formula:

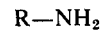

wherein
R is as above defined, in the presence of an acid acceptor. However when one of the reactants already has acid-binding properties, the acid acceptor is not essential.

These N-alkyl-1,4-dihydropyridines are useful for their coronary dilating effect and are also useful as blood pressure depressing agents.

2 Claims, No Drawings

N-ALKYL-1,4-DIHYDROPYRIDINES

This is a division of application Ser. No. 201,152 filed Nov. 22, 1971, now U.S. Pat. No. 3,773,773 dated Nov. 20, 1973, which itself is a continuation of application Ser. No. 35,574 filed May 7, 1970, now abandoned.

The present invention is concerned with N-alkyl-1,4-dihydropyridines and their production. More particularly, the present invention is concerned with N-alkyl-1,4-dihydropyridines of the formula:

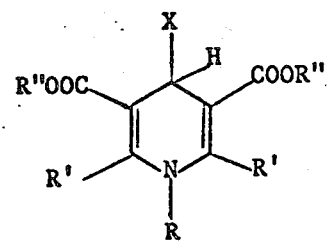

wherein
R is a saturated or unsaturated straight or branched chain aliphatic moiety, a saturated or unsaturated cycloaliphatic moiety, said cycloaliphatic moiety having an N, S or O heteroatom, said cycloaliphatic moiety or said cycloaliphatic moiety having an N, S, or O heteroatom substituted by carboxy, carbalkoxy, alkoxy, especially lower alkoxy, alkylmercapto, especially lower alkylmercapto, alkylamino, especially lower alkylamino, or dialkylamino, especially di-lower alkylamino, an araliphatic moiety or an araliphatic moiety substituted by alkyl, especially lower alkyl, alkoxy, especially lower alkoxy, nitro or halogen,
R' is hydrogen or straight or branched chain alkyl of 1 to 4 carbon atoms, aryl, aryl substituted by alkyl, especially lower alkyl, nitro or halogen, or a heterocycle,
R" is a saturated or unsaturated, straight or branched chain aliphatic moiety of 1 to 6 carbon atoms, a saturated or unsaturated cycloaliphatic moiety or said cycloaliphatic moiety having an N, S or O heteroatom, and
X is a saturated or unsaturated, straight or branched chain aliphatic or isocyclic moiety, a heterocycle, aryl, aryl substituted by alkyl, especially lower alkyl, alkoxy, especially lower alkoxy, carbalkoxy, especially carb-lower alkoxy, alkylmercapto, especially lower alkylmercapto, trifluoromethyl, nitrile, nitro or halogen, aralkyl, aralkylene or aralkyl or aralkylene substituted by alkyl, especially lower alkyl, alkoxy, especially lower alkoxy, carbalkoxy, especially carb-lower alkoxy, alkylmercapto especially lower alkylmercapto, trifluoromethyl, nitrile, nitro or halogen.

The production of N-alkyl-1,4-dihydropyridines from aldehydes and β-alkylaminocrotonic acid esters is known [Belgian Patent Specification No. 710,391; Helv. Chim. Acta 41 (1958), 2066].

It is further known that N-alkyl-1,4-dihydropyridines can also be obtained by the oxidation of 1,4-dihydropyridines to form pyridines, quaternization with alkyl halides and reduction of the quaternary ammonium compounds [for literature references see above].

However, it has not been possible generally to translate the known preparation of 1,4-dihydropyridines by the reaction of aldehyde with β-ketocarboxylic acid esters and ammonia to the preparation of N-alkyl-1,4-dihydropyridines from aldehydes, β-ketocarboxylic acid esters and alkylamines.

Some N-alkyl-1,4-dihydropyridines and a method for their production are disclosed in U.S. Ser. No. 880,946, filed Nov. 28, 1969.

It has now been found that N-alkyl-1,4-dihydropyridines of the formula:

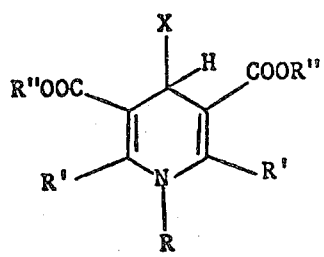

wherein R, R', R" and X are as above defined may be produced in a direct way which results in high yield by reacting aldehydes of the general formula:

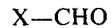
X—CHO with β-ketocarboxylic acid esters of the formula:

R'—CO—CH$_2$—COOR"

wherein R' and R" are as above defined with salts of alkylamines of the formula:

R—NH$_2$ wherein R is as above defined in the presence of an acid acceptor. The addition of the acid acceptor is, however, unnecessary when one of the reaction components already has acid-binding properties. For example, N-alkyl-1,4-dihydropyridines are produced by reacting pyridine aldehydes, β-ketocarboxylic acid esters via the corresponding salts, and alkylamine salts by heating in an organic solvent such as alcohols without the addition of a further acid acceptor.

According to the present invention, the preferred acid addition salts of the alkylamines include the acid addition salts with inorganic acids, such as hydrohalic acids, sulphuric acid, nitric acid, phosphoric acid and the like, as well as the acid addition salts with organic acids, such as acetic acid.

Suitable acid acceptors are basic compounds, such as tertiary amines, such as trialkylamines, pyridine, picoline, quinoline, N-methyl-piperidine, N-methyl-morpholine, N,N-dimethylpiperazine, as well as the alkylamines corresponding to the alkylamine salts, that is alkylamines of the formula:

R—NH$_2$ wherein R is as above defined.

Pyridine has been found to be particularly suitable and it is used in the amount equivalent to the alkylamine salt or, if no organic solvent is used, in excess.

The compounds of the present invention are particularly useful for their coronary dilating effect and are also useful as blood pressure depressants.

EXAMPLE 1

N-methyl-2,4,6-trimethyl-1,4-dihydropyridine-3,5-dicarboxylic acid diethyl ester 8.8 g acetic aldehyde, 52 cc acetoacetic acid ethyl ester and 16 g methylamine hydrochloride are heated in 40 cc pyridine for ½ to 1 hour at 100°C (External temperature), the mixture is subsequently poured into ice-water while stirring, taken up with ether after decanting, and rinsing with water, the ether is distilled off, and 18 g of almost colourless crystals of m.p. 84°C. are obtained from petroleum ether (animal charcoal).

In the same way, N-methyl-2,6-dimethyl-4-isopropyl-1,4-dihydropyridine-3,5-dicarboxylic acid diethyl ester is obtained in the form of white crystals of m.p. 73°C. (28 g) by reacting isobutyraldehyde with acetoacetic acid ethyl ester and methylamine hydrochloride.

In the same way, N-methyl-2,6-dimethyl-4-n-hexyl-1,4-dihydropyridine-3,5-dicarboxylic acid dimethyl ester m.p. 65°C. is obtained by reacting caproaldehyde with acetoacetic acid dimethyl ester and methylamine hydrochloride.

EXAMPLE 2

N-methyl-2,6-dimethyl-4-phenyl-1,4-dihydropyridine-3,5-dicarboxylic acid diethyl ester After heating 21 g benzaldehyde, 52 cc acetoacetic acid ethyl ester and 16 g methylamine hydrochloride in 50 cc pyridine at 100°C. for 2 hours, the mixture is poured into ice-water, suction-filtered, the filtrate is rinsed with water, and 36 g of yellow crystals of m.p. 130° to 131°C. are obtained from about 250 to 300 cc of alcohol.

In the same way, the following compounds were prepared from the reactants listed:

a. N-methyl-2,6-dimethyl-4-(2'-trifluoromethylphenyl)-1,4-dihydropyridine-3,5-dicarboxylic acid dimethyl ester of m.p. 164°C. from 2-trifluoromethyl benzaldehyde, acetoacetic acid methyl ester and methylamine hydrochloride;

b. N-methyl-2,6-dimethyl-4-(3'-trifluoromethylphenyl)-1,4-dihydropyridine-3,5-dicarboxylic acid dimethyl ester of m.p. 110°C. from 3-trifluoromethyl benzaldehyde, acetoacetic acid methyl ester and methylamine hydrochloride;

c. N-methyl-2,6-dimethyl-4-(phenyl-4'-hydroxy acetic acid ethyl ester)-1,4-dihydropyridine-3,5-dicarboxylic acid diethyl ester of m.p. 108°C. from benzaldehyde-4-hydroxy acetic acid ethyl ester, acetoacetic acid ethyl ester and methylamine hydrochloride;

d. N-isopropyl-2,6-dimethyl-4-(2'-nitrophenyl)-1,4-dihydropyridine-3,5-dicarboxylic acid dimethyl ester of m.p. 187°C. from 2-nitro-benzaldehyde, acetoacetic acid methyl ester and methylamine hydrochloride;

e. N-methyl-2,6-dimethyl-4-(2'-nitro-3'-chlorophenyl)-1,4-dihydropyridine-3,5-dicarboxylic acid dimethyl ester of m.p. 164°C. from 2-nitro-3-chlorobenzaldehyde, acetoacetic acid methyl ester and methylamine hydrochloride;

f. N-methyl-2,6-dimethyl-4-(2'-nitro-4'-chlorophenyl)-1,4-dihydropyridine-3,5-dicarboxylic acid dimethyl ester of m.p. 136°C. from 2-nitro-4-chlorobenzaldehyde, acetoacetic acid methyl ester and methylamine hydrochloride;

g. N-methyl-2,6-dimethyl-4-(3'-nitro-4'-methoxyphenyl)-1,4-dihydropyridine-3,5-dicarboxylic acid dimethyl ester of m.p. 143°C. from 3-nitro-4-methoxybenzaldehyde, acetoacetic acid methyl ester and methylamine hydrochloride;

h. N-methyl-2,6-dimethyl-4-(2'-methoxy-4'-nitrophenyl)-1,4-dihydropyridine-3,5-dicarboxylic acid dimethyl ester of m.p. 178° C. from 2-methoxy-4-nitrobenzaldehyde, acetoacetic acid methyl ester and methylamine hydrochloride;

i. N-methyl-2,6-dimethyl-4-(2'-nitro-5'-methoxyphenyl)-1,4-dihydropyridine-3,5-dicarboxylic acid dimethyl ester of m.p. 144°C. from 2-nitro-5-methoxybenzaldehyde, acetoacetic acid methyl ester and methylamine hydrochloride;

j. N-methyl-2,6-diethyl-4-(3'-nitrophenyl)-1,4-dihydropyridine-3,5-dicarboxylic acid diethyl ester of m.p. 66°C. from 3-nitrobenzaldehyde, levulinic acid ethyl ester and methylamine hydrochloride; and k. N-methyl-2,6-dimethyl-4-(4'-carbmethoxyphenyl)-1,4-dihydropyridine-3,5-dicarboxylic acid dimethyl ester of m.p. 149°C. from 4-carbmethoxybenzaldehyde, acetoacetic acid methyl ester and methylamine hydrochloride.

EXAMPLE 3

N-methyl-2,6-dimethyl-4-(3'-nitro-4'-chlorophenyl)-1,4-dihydropyridine-3,5-dicarboxylic acid dimethyl ester 18.5 g 4-chloro-3-nitro-benzaldehyde, 25 cc acetoacetic acid methyl ester and 8.5 g methylamine hydrochloride are heated in 40 cc pyridine at about 90°C. for 1 hour, the mixture is poured into water, and after filtering off with suction and recrystallization from methanol, 31 g of pale brown crystals of m.p. 128°C. are obtained.

In the same way, the following compounds were prepared from the reactants listed:

a. N-methyl-2,6-dimethyl-4-(3'-nitro-6'-chlorophenyl)-1,4-dihydropyridine-3,5-dicarboxylic acid dimethyl ester of m.p. 192° C. from 6-chloro-3-nitro-benzaldehyde, acetoacetic acid methyl ester and methylamine hydrochloride;

b. N-n-butyl-2,6-dimethyl-4-(3'-nitro-6'-chlorophenyl)-1,4-dihydropyridine-3,5-dicarboxylic acid dimethyl ester of m.p. 158° C. from 6-chloro-3-nitro-benzaldehyde, acetoacetic acid methyl ester and n-butylamine hydrochloride.

EXAMPLE 4

N-methyl-2,6-dimethyl-4-(4'-methoxyphenyl)-1,4-dihydropyridine-3,5-dicarboxylic acid dimethyl ester a. 14 g 4-methoxy-benzaldehyde, 25 cc acetoacetic acid methyl ester and 7 g methylamine hydrochloride are heated in 20 cc pyridine at 70° to 80° C. for 1 to 2 hours, the mixture is poured into water, suction-filtered, and 18 g of white crystals of m.p. 159° to 161° C. are obtained from 220 cc methanol (animal charcoal).

b. After heating a solution of 14 g 4-methoxy-benzaldehyde, 25 cc acetoacetic acid methyl ester, 7 g methylamine hydrochloride and 7 cc pyridine in 100 cc methanol for 2 hours, the product is filtered off (animal charcoal) and cooled. After filtering off with suction and washing with cold ether, crystals of m.p. 158° to 160° C. (14 g) are obtained.

In the same way, the following compounds were prepared from the reactants listed:

a. N-methyl-2,6-dimethyl-4-(3', 4', 5'-trimethoxyphenyl)-1,4-dihydropyridine-3,5-dicarboxylic acid dimethyl ester, m.p. 119° to 122° C. according to the process of Example 4 (a) from 3,4,5-trimethoxy-benzaldehyde, acetoacetic acid methyl ester and methylamine hydrochloride;

b. N-methyl-2,6-dimethyl-4-(4'-nitrophenyl)-1,4-dihydropyridine-3,5-dicarboxylic acid dimethyl ester, m.p. 158° to 160° C. according to the process of Example 4 (a) from 4-nitro-benzaldehyde, acetoacetic acid methyl ester and methylamine hydrochloride;

c. N-methyl-2,6-dimethyl-4-(4'-dimethylaminophenyl)-1,4-dihydropyridine-3,5-dicarboxylic acid dimethyl ester, m.p. 145° to 146° C. according to the process of Example 4 (a) from 4-dimethylamino-benzaldehyde, acetoacetic acid methyl ester and methylamine hydrochloride.

EXAMPLE 5

N-methyl-2,6-dimethyl-4-(3'-nitrophenyl)-1,4-dihydropyridine-3,5-dicarboxylic acid di-$\beta$-propoxyethyl ester 15 g (b)) -nitro-benzaldehyde are heated with 8 g methylamine hydrochloride and 40 cc acetoacetic acid $\beta$-propoxyethyl ester in 30 cc pyridine at about 90°C. for 5 to 6 hours, the mixture is poured into ice-water, and after filtering off with suction and drying, 46 g of yellow crystals of m.p. 53° to 56° C. are obtained; these are recrystallized from 700 to 800 cc ligroin (animal charcoal). Pale yellow crystals of m.p. 54° C.

EXAMPLE 6

N-methyl-2,6-dimethyl-4-ethylphenyl-1,4-dihydropyridine-3,5-dicarboxylic acid dimethyl ester After heating 13.4 g hydrocinnamic aldehyde, 25 cc acetoacetic acid methyl ester and 8 g methylamine hydrochloride in 20 cc pyridine for 3 hours, the mixture is poured into ice-water and suction-filtered. 12 g of white crystals of m.p. 108° to 110° C. are obtained from 100 cc methanol.

In the same way, N-methyl-2,6-dimethyl-4-styryl-1,4-dihydropyridine-3,5-dicarboxylic acid dimethyl ester m.p. of 146° to 148° C. (methanol) is obtained by reacting cinnamic aldehyde, acetoacetic acid methyl ester and methylamine hydrochloride.

EXAMPLE 7

N-methyl-2,6-dimethyl-4-($\alpha$-pyridyl)-1,4-dihydropyridine-3,5-dicarboxylic acid diethyl ester 10 cc pyridine-2-aldehyde, 28 cc acetoacetic acid ethyl ester and 8 g methylamine hydrochloride are heated at about 90°C. for ¾ to 1 hour, the mixture is subsequently poured into water, and after filtering off with suction and recrystallization from 100 cc methanol, 14 g of pale yellow crystals of m.p. 104° to 106° C. are obtained.

In the same way, N-methyl-2,6-dimethyl-4-($\alpha$-pyridyl)-1,4-dihydropyridine-3,5-dicarboxylic acid diisopropyl ester m.p. at 115° C. is obtained by reacting pyridine-2-aldehyde, acetoacetic acid isopropyl ester, and methylamine hydrochloride.

In the same manner, N-allyl-2,6-dimethyl-4-($\alpha$-pyridyl)-1,4dihydropyridine-3,5-dicarboxylic acid dimethyl ester m.p. at 106° C. is obtained by reacting pyridine-2-aldehyde, acetoacetic acid methyl ester, and allylamine hydrochloride.

EXAMPLE 8

N-methyl-2,6-dimethyl-4-($\beta$-pyridyl)-1,4-dihydropyridine-3,5-dicarboxylic acid di-($\beta$-propoxyethyl) ester After heating 10 cc 3-pyridine-aldehyde, 40 cc acetoacetic acid $\beta$-propoxyethyl ester and 8 g methylamine hydrochloride in 30 cc pyridine at about 90°C. for 3 to 4 hours, the mixture is poured into ice-water, suction-filtered, the filtrate is dried (33 g) and recrystallized from 500 to 600 g ligroin/animal charcoal; crystals of m.p. 56° C.

In the same way, the following compounds were prepared from the reactants listed:

a. N-methyl-2,6-dimethyl-4-($\alpha$-pyridyl)-1,4-dihydropyridine-3,5-dicarboxylic acid-di-$\beta$-propoxyethyl ester of m.p. 80° to 82° C. (ligroin) from pyridine-2-aldehyde, acetoacetic acid $\beta$-propoxyethyl ester and methylamine hydrochloride;

b. N-methyl-2,6-diethyl-4-($\alpha$-pyridyl)-1,4-dihydropyridine-3,5-dicarboxylic acid diethyl ester, m.p. 116° C. from pyridine-2-aldehyde, acetoacetic acid ethyl ester and ethylamine hydrochloride.

EXAMPLE 9

N-benzyl-2,6-dimethyl-4-($\alpha$-pyridyl)-1,4-dihydropyridine-3,5-dicarboxylic acid dimethyl ester A solution of 10 cc pyridine-2-aldehyde, 25 cc acetoacetic acid methyl ester and 15 g benzylamine hydrochloride in 100 cc methanol is heated at boiling temperature overnight, the mixture is concentrated by evaporation in a vacuum, and 20 g of pale yellow crystals of m.p. 177° to 180° C. (HCl salt) are obtained from 200 to 250 cc acetone. The free compound mets at 130° C.

EXAMPLE 10

N-carbethoxymethyl-2,6-dimethyl-4-($\alpha$-pyridyl)-1,4-dihydropyridine-3,5-dicarboxylic acid dimethyl ester 10 cc pyridine-2-aldehyde, 25 cc acetoacetic acid methyl ester and 14 g aminoacetic acid ethyl ester hydrochloride are heated in 50 cc methanol at boiling temperature overnight, the mixture is concentrated by evaporation in a vacuum, mixed with acetone, suction-filtered and again evaporated. The residue is dissolved in a little water, a sodium carbonate solution is added, and the solution is extracted several times with ether. The crystals obtained after drying and distilling off the ether (12 g, m.p. 85° to 90° C.) are recrystallized from ether/petroleum ether. White crystals of m.p. 102° to 104° C.

In the same manner, N-carbethoxymethyl-2,6-dimethyl-4-($\beta$-pyridyl)-1,4-dihydropyridine-3,5-dicarboxylic acid dimethyl ester m.p. 116° to 118° C. is obtained by reacting pyridine-3-aldehyde, acetoacetic acid methyl ester, and aminoacetic acid ethyl ester hydrochloride.

EXAMPLE 11

N-methyl-2,6-dimethyl-4-(α-tetrahydropyranyl)-1,4-dihydropyridine-3,5-dicarboxylic acid diethyl ester 11 cc α-tetrahydropyranaldehyde, 28 cc acetoacetic acid ethyl ester and 8 g methylamine hydrochloride are heated in 200 cc pyridine at about 90° C. for 4 hours. The mixture is subsequently poured into ice-water, suction filtered and after recrystallization from alcohol, white crystals of m.p. 122° to 124° C. are obtained.

In the same manner, N-methyl-2,6-dimethyl-4-(α-tetrahydropyranyl)-1,4-dihydropyridine-3,5-dicarboxylic acid dimethyl ester m.p. 133° C. is obtained by reacting α-tetrahydropyranaldehyde, acetoacetic acid methyl ester and methylamine hydrochloride.

Example 12 below provides a comparison demonstrating the superiority of the process of the present invention which utilizes an alkylamine salt (see method (b) of Example 12) as compared to a known process using an alkylamine (see method (a) of Example 12).

EXAMPLE 12

N-methyl-2,6-dimethyl-4-(α-pyridyl)-1,4-dihydropyridine-3,5-dicarboxylic acid dimethyl ester a. After heating a solution of 20 cc pyridine-2-aldehyde, 50 cc acetoacetic acid methyl ester and 30 cc of a 30 to 40 percent aqueous methylamine solution in 100 cc methanol under reflux for 2 to 3 hours, the product is filtered off with suction through animal charcoal and concentrated to half its volume. After the addition of ether and cooling, 5 g of pale yellow crystals are obtained. White crystals of m.p. 160° to 162° F. from methanol.

b. 20 cc pyridine-2-aldehyde, 50 cc acetoacetic acid methyl ester and 14 g methylamine hydrochloride are heated in 100 cc methanol at boiling temperature for several hours, the mixture is somewhat concentrated by evaporation in a vacuum, and after cooling, filtering off with suction and washing with acetone and ether, 25 g of yellow-green crystals (hydrochloride) of m.p. 198° C. are obtained.

The free compound is obtained from the hydrochloride in the form of colourless crystals of m.p. 160° to 162° C. (methanol).

In the same way (method (b) the following compounds were obtained via the hydrochlorides:

a. N-methyl-2,6-dimethyl-4-(α-pyridyl)-1,4-dihydropyridine-3,5-dicarboxylic acid-di-(β-methoxyethyl) ester of m.p. 106° to 108° C. from pyridine-2-aldehyde, acetoacetic acid β-methoxyethyl ester, and methylamine hydrochloride;

b. N-ethyl-2,6-dimethyl-4-(α-pyridyl)-1,4-dihydropyridine-3,5-dicarboxylic acid dimethyl ester m.p. 122° to 124° C. from pyridine-2-aldehyde, acetoacetic acid methyl ester, and ethylamine hydrochloride;

c. N-isopropyl-2,6-dimethyl-4-(α-pyridyl)-1,4-dihydropyridine-3,5-dicarboxylic acid dimethyl ester m.p. 129° to 131° C. from pyridine-2-aldehyde, acetoacetic acid methyl ester and isopropylamine hydrochloride.

EXAMPLE 13

N-methyl-2,6-dimethyl-4-(α-thienyl)-1,4-dihydropyridine-3,5-dicarboxylic acid dimethyl ester A solution of 12 cc thiophen-2-aldehyde, 25 cc acetoacetic acid methyl ester and 8 g methylamine hydrochloride in 20 cc pyridine is heated with stirring at 90° to 100° C. for 2 hours, the mixture is poured into water, the product is filtered off with suction and rinsed with water. White crystals of m.p. 208° C. (21 g from alcohol).

EXAMPLE 14

N-methyl-2,6-diphenyl-4-(4'-nitrophenyl)-1,4-dihydropyridine-3,5-dicarboxylic acid diethyl ester After heating 15 g 4-nitro-benzaldehyde, 36 cc benzoylacetic acid ethyl ester and 9 g methylamine hydrochloride in 30 cc pyridine at 100° C. (External temperature) for about 20 hours, the mixture is poured into ice-water, the crystalline residue obtained, after decanting, by the addition of some ether is filtered off with suction and recrystallized from alcohol. Yellow crystals (19 g) of m.p. 200° C. are obtained.

The N-methyl-2,4,6-tri(4'-nitrophenyl)-1,4-dihydropyridine-3,5-dicarboxylic acid diethyl ester obtained in the same way after heating for 48 hours has m.p. 166° C. (alcohol).

EXAMPLE 15

N-methyl-2,6-di-(γ-pyridyl)-4-(2'-nitrophenyl)-1,4-dihydropyridine-3,5-dicarboxylic acid diethyl ester 15 g 2-nitro-benzaldehyde, 38 g γ-pyridoylacetic acid ethyl ester and 9 g methylamine hydrochloride are heated in 60 cc pyridine at 100°C. for about 3 hours, the mixture is poured into ice-water and after drying and recrystallization from ligroin/benzene, crystals (15 g) m.p. 115° C. are obtained.

EXAMPLE 16

N-benzyl-2,6-dimethyl-4-(3'-trifluoromethylphenyl)-1,4-dihydropyridine-3,5-dicarboxylic acid dimethyl ester 17.5 g 3-trifluoromethyl-benzaldehyde, 15 g benzylamine hydrochloride and 25 cc acetoacetic acid methyl ester are heated in 30 cc pyridine at about 90°C. for 4 hours, the mixture is poured into ice-water, suction-filtered, and 17 g of white crystals of m.p. 115° C. are obtained from methanol.

In the same manner, N-benzyl-2,6-dimethyl-4-(3'-nitro-6'-chlorophenyl)-1,4-dihydropyridine-3,5-dicarboxylic acid dimethyl ester m.p. 166° C. is obtained from 3-nitro-6-chlorobenzaldehyde, acetoacetic acid methyl ester and benzylamine hydrochloride.

What is claimed is:

1. N-n-butyl-2,6-dimethyl-4-(3'-nitro-6'-chlorophenyl)-1,4-dihydropyridine-3,5-dicarboxylic acid dimethyl ester.

2. N-methyl-2,6-diphenyl-4-(4'-nitrophenyl)-1,4-dihydropyridine-3,5-dicarboxylic acid diethyl ester.

* * * * *